United States Patent
Brown et al.

(10) Patent No.: US 7,283,527 B2
(45) Date of Patent: Oct. 16, 2007

(54) APPARATUS AND METHOD OF MAINTAINING TWO-BYTE IP IDENTIFICATION FIELDS IN IP HEADERS

(75) Inventors: Deanna Lynn Quigg Brown, Pflugerville, TX (US); Vinit Jain, Austin, TX (US); Jeffrey Paul Messing, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 10/087,939

(22) Filed: Feb. 27, 2002

(65) Prior Publication Data

US 2003/0161312 A1    Aug. 28, 2003

(51) Int. Cl.
*H04L 12/56* (2006.01)
*H04J 3/24* (2006.01)
*G06F 15/16* (2006.01)

(52) U.S. Cl. .............. 370/392; 370/395.52; 370/474; 709/203; 709/236

(58) Field of Classification Search ............. 370/392, 370/389, 474, 465, 252, 539, 470, 471, 395.5, 370/395.52, 469, 395, 395.53, 335, 342, 370/401, 472, 473, 486, 487, 489, 490, 522, 370/60.1, 60, 61, 85.1, 85.4, 85.13, 92, 93, 370/94.1; 380/255, 270; 707/501, 513, 707/102; 371/20.1, 3, 24; 709/213, 218, 709/203, 236; 715/744; 713/152; 455/4.1, 455/4.2, 6.11; 375/200; 345/700, 336, 333, 345/334

See application file for complete search history.

(56) References Cited

U.S. PATENT DOCUMENTS

| | | | | |
|---|---|---|---|---|
| 5,570,365 A | * | 10/1996 | Yoshida | 370/401 |
| 5,594,869 A | * | 1/1997 | Hawe et al. | 713/152 |
| 5,815,516 A | * | 9/1998 | Aaker et al. | 714/807 |
| 5,937,169 A | * | 8/1999 | Connery et al. | 709/250 |
| 5,991,308 A | * | 11/1999 | Fuhrmann et al. | 370/395.53 |
| 6,092,078 A | * | 7/2000 | Adolfsson | 707/102 |
| 6,119,171 A | * | 9/2000 | Alkhatib | 709/245 |
| 6,430,623 B1 | * | 8/2002 | Alkhatib | 709/245 |
| 6,463,061 B1 | * | 10/2002 | Rekhter et al. | 370/392 |
| 6,466,964 B1 | * | 10/2002 | Leung et al. | 709/202 |
| 6,532,217 B1 | * | 3/2003 | Alkhatib et al. | 370/252 |
| 6,590,588 B2 | * | 7/2003 | Lincke et al. | 715/744 |
| 6,594,278 B1 | * | 7/2003 | Baroudi | 370/466 |
| 6,714,985 B1 | * | 3/2004 | Malagrino et al. | 709/236 |
| 6,772,227 B2 | * | 8/2004 | Alkhatib | 709/245 |
| 6,980,549 B1 | * | 12/2005 | Shabtay et al. | 370/392 |

(Continued)

*Primary Examiner*—Alpus H. Hsu
(74) *Attorney, Agent, or Firm*—Volel Emile; Mark E. McBurney; Diana L. Roberts-Gerhardt

(57) ABSTRACT

A method, system and apparatus for maintaining a two-byte identification field of IP headers when a Gigabit Ethernet is in use are provided. Since the IP identification field is of two bytes, there is a limited number of identification numbers that may be used. Due to the high data transfer rate of the Gigabit Ethernet, this number may be reached within one second. Hence, there may be a possibility that two or more packets may have the same identification number while in transit. In a representative embodiment, one identification number is used for packets that may not be fragmented; thus, freeing the rest of the numbers for packets that may be fragmented.

12 Claims, 5 Drawing Sheets

U.S. PATENT DOCUMENTS

| | | | |
|---|---|---|---|
| 7,050,437 B2 * | 5/2006 | Bilic et al. | 370/394 |
| 2002/0080829 A1 * | 6/2002 | Ofek et al. | 370/539 |
| 2002/0109706 A1 * | 8/2002 | Lincke et al. | 345/700 |
| 2003/0016672 A1 * | 1/2003 | Rosen et al. | 370/392 |

* cited by examiner

| BIT | 0 | 1 | 2 | 3 | 4 | 5 | 6 | 7 | |
|---|---|---|---|---|---|---|---|---|---|
| BYTE 0 | 500 | VERSION | | | H LENGTH | | | | 502 / 504 |
| BYTE 1 | SERVICE TYPE ||||||||  |
| BYTE 2 | TOTAL LENGTH |||||||| 506 |
| BYTE 3 | ||||||||| |
| BYTE 4 | IDENTIFICATION |||||||| 508 |
| BYTE 5 | ||||||||| |
| BYTE 6 | 510 | FLAGS | | | FRAGMENT OFFSET | | | | 512 |
| BYTE 7 | FRAGMENT OFFSET |||||||| |
| BYTE 8 | TIME-TO-LIVE |||||||| 514 |
| BYTE 9 | PROTOCOL |||||||| 516 |
| BYTE 10 | CHECKSUM |||||||| 518 |
| BYTE 11 | ||||||||| |
| BYTE 12 | SOURCE IP ADDRESS |||||||| 520 |
| BYTE 13 | ||||||||| |
| BYTE 14 | ||||||||| |
| BYTE 15 | ||||||||| |
| BYTE 16 | DESTINATION IP ADDRESS |||||||| 522 |
| BYTE 17 | ||||||||| |
| BYTE 18 | ||||||||| |
| BYTE 19 | ||||||||| |
| BYTE 20 | IP OPTIONS |||||||| 524 |
| BYTE 21 | ||||||||| |
| BYTE 22 | ||||||||| |

FIG. 5

APPARATUS AND METHOD OF MAINTAINING TWO-BYTE IP IDENTIFICATION FIELDS IN IP HEADERS

BACKGROUND OF THE INVENTION

1. Technical Field

The present invention is directed to communications networks. More specifically, the present invention is directed to a method and apparatus for maintaining two-byte IP identification fields in IP headers.

2. Description of Related Art

There are several local area network (LAN) technologies in use today, but the most popular by far is the Ethernet. The Ethernet is an open-standard technology. This openness, combined with the ease of use and robustness of the Ethernet system contribute to its widespread implementation in the industry.

The Ethernet supports data transfer rates of 10 Mbps (megabits per second). However, many customers currently have, or foresee having, network throughput bottlenecks due to faster server processors, new applications, and more demanding environments that require greater network data transfer rates than existing LANs can provide. In addition, as networks mature, server consolidation results in a greater number of users and more network traffic per average file server, further straining the throughput capabilities of existing LANs. New data-intensive applications, such as network file server backups and synchronized voice/video, require reduced latency, as well as new levels of data transmission speed and reliability. To meet this ever-increasing increasing demand, faster Ethernet technologies are being defined with data throughput of 100 Mbps and 1000 Mbps. The 1000 Mbps Ethernet is referred to as a Gigabit Ethernet.

In any event, data is generally transmitted on a network in packets. Before being transmitted, however, several headers may be added to the packets. One of the headers that may be added is an Internet protocol (IP) header. The IP header has a two-byte identification field that is used to facilitate packet fragmentations. For example, as a packet is traversing the network, routers may fragment the packet into smaller packets. To ascertain that a receiving computer system is able to reconstruct a packet after it has been fragmented in transit, a transmitting computer system will give the packet an identity by entering a number into the IP identification field. If fragmented, each fragment will retain the IP identification number in its IP header. When the receiving computer system receives the fragments, using the IP identification number along with other fields in the IP header, it will be able to reconstruct the packet.

The two-byte identification field allows for 65,536 unique IP packets to be generated before the IP identification numbers recycle. With the use of the Gigabit Ethernet, however, this number of packets can be generated within one (1) second. Presently, it is rather common to have fragment re-assembly timers of thirty (30) seconds. Thus, using a fragment re-assembly timer of thirty (30) seconds with the Gigabit Ethernet may result in two different IP packets having the same IP identification number on the network. Hence, fragments from the two different packets may be mixed together.

Thus, what is needed is a method and apparatus for ascertaining that unique IP identification numbers are used without modifying the IP identification field of the IP headers.

SUMMARY OF THE INVENTION

The present invention provides a method, system and apparatus for maintaining a two-byte identification field of IP headers when a Gigabit Ethernet is in use. Since the identification field is of two bytes, there is a limited number of identification numbers that may be used. Due to the high data transfer rate of the Gigabit Ethernet, this number may be reached within one second. Hence, there may be a possibility that two or more packets may have the same identification number while in transit. In a representative embodiment, one identification number is used for packets that may not be fragmented. Thus, freeing the rest of the numbers for the packets that may be fragmented. Consequently, before the IP header is added to the packet, a check is made to determine whether the packet may be fragmented. If so, a unique identification number is used in the identification field of the IP header. If not, a non-unique number is used. The non-unique number is a number that is used for all packets that may not be fragmented.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts an IP header in bytes format.

DETAILED DESCRIPTION OF THE PREFERRED EMBODIMENT

Figure 1:
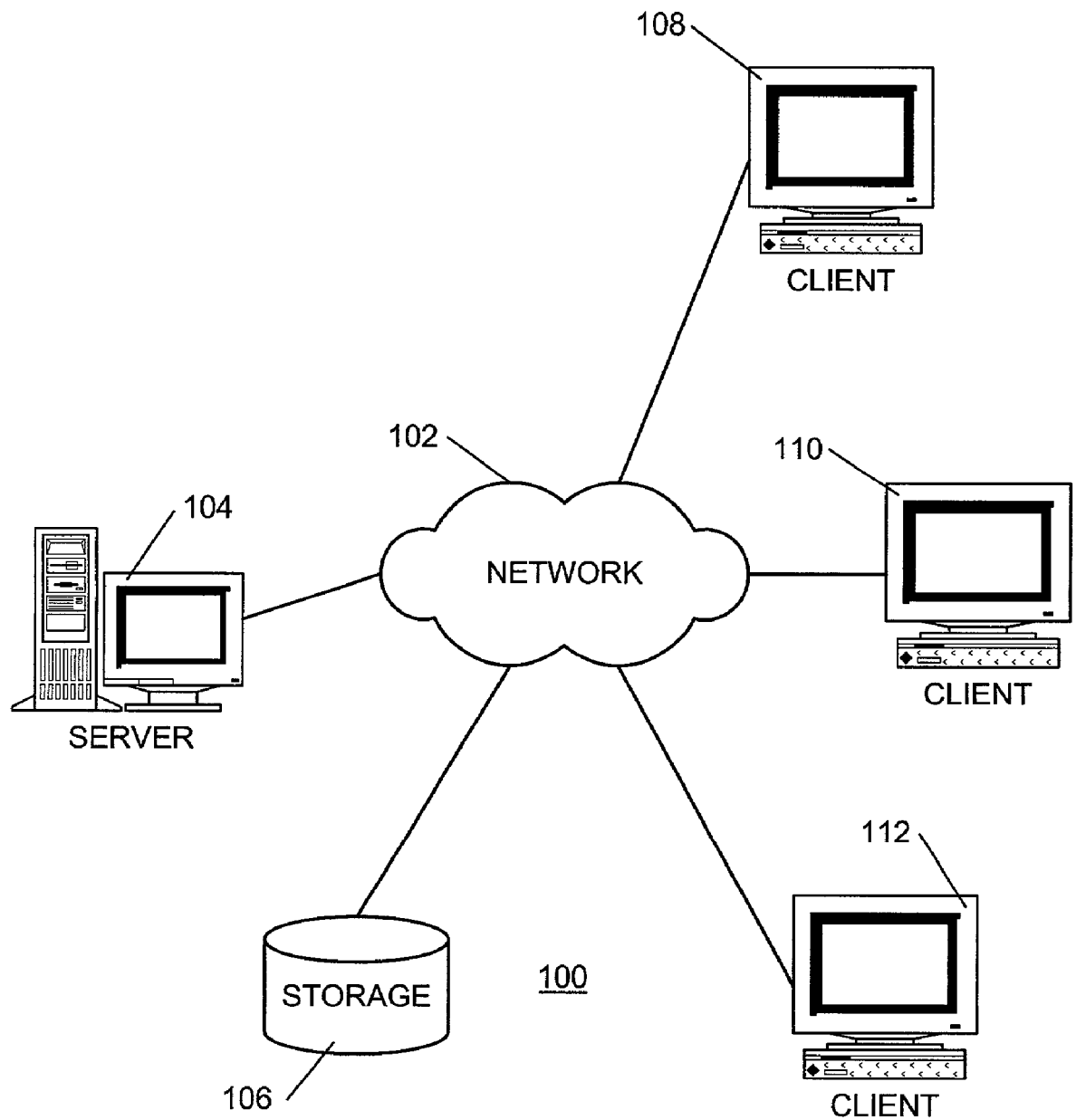
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
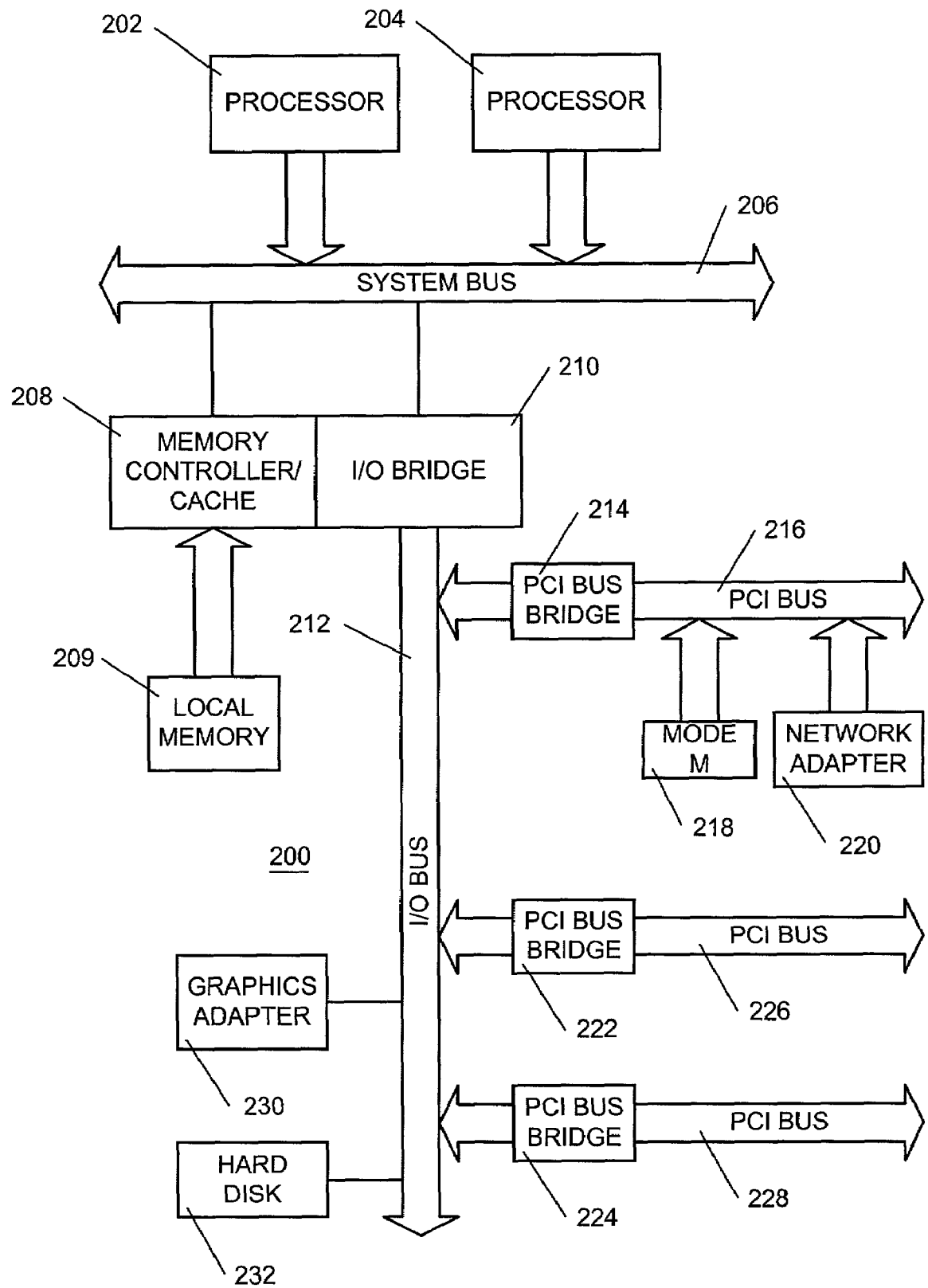
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
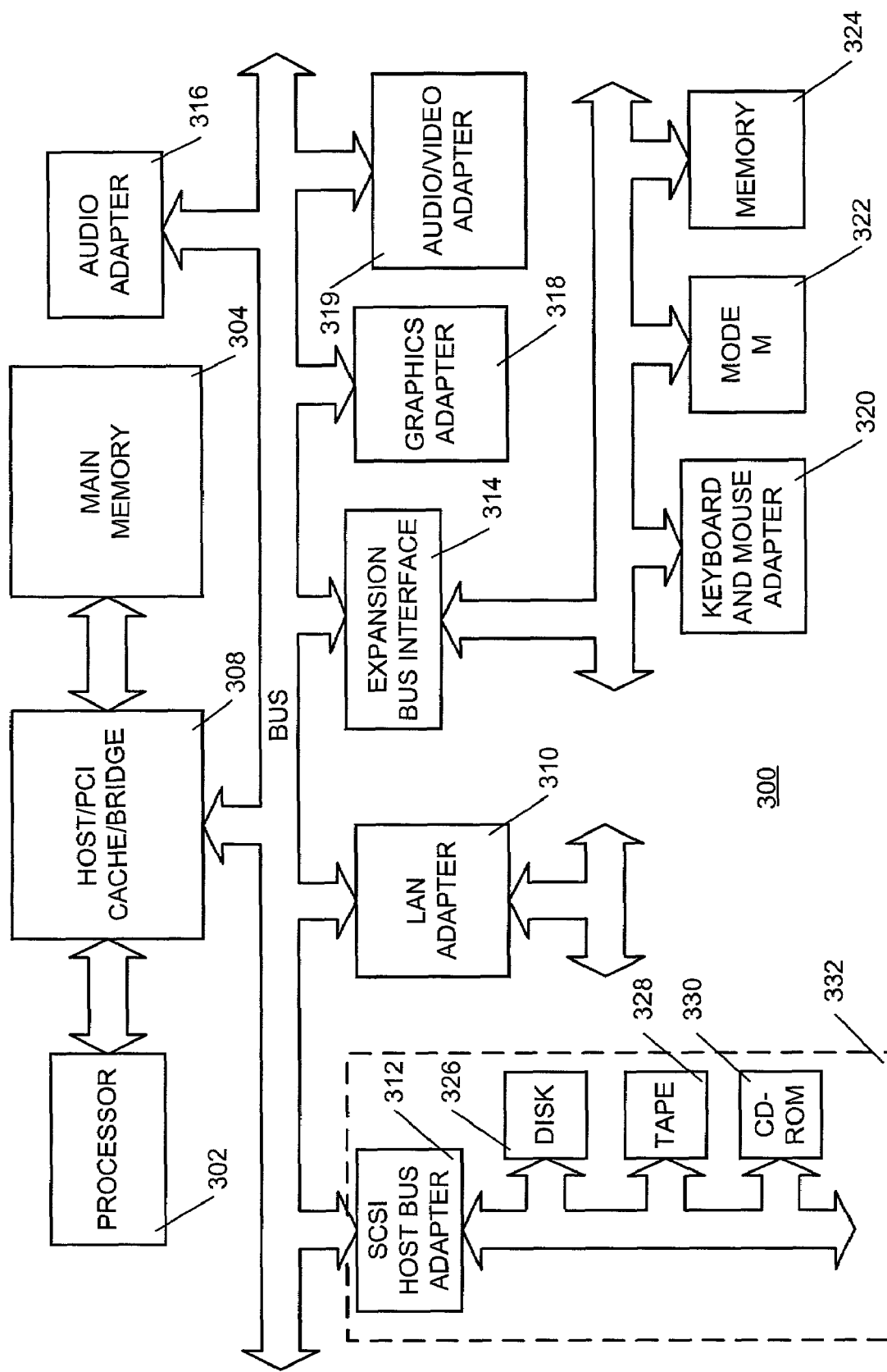
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of maintaining two-byte identification field of IP headers when a Gigabit Ethernet is used. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

Figure 4:
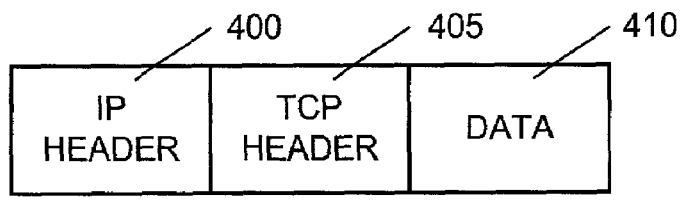
FIG. 4 depicts a data packet with a TCP/IP header.

For a proper perspective, a representative data packet with a TCP/IP header will be described. FIG. 4 depicts such a data packet. When data is to be transmitted to a target computer system from a source system, the source system will first divide the data into packets, if the data is of a length longer than the allowable data packet length. Each packet then is sent to a TOP stack where a TCP header 405 is added to data 410. From the TCP stack, the data packet including the TCP header 405 is forwarded to an IP stack. There, IP header 400 is added to the data packet. Once the IP header is added, the data packet is allowed to enter the network through a network interface (e.g., an Ethernet adapter or card).

The description of the invention will be focused on the IP header, since the TCP header is not necessary to understand the invention. FIG. 5 depicts an IP header in bytes format. Version 500 is the version of the IP protocol used to create the data packet and header length 502 is the length of the header. Service type 504 specifies how an upper layer protocol would like a current data packet handled. Each data packet is assigned a level of importance. Total length 506 specifies the length, in bytes, of the entire IP data packet, including the data and header. Identification 508 is used when a packet is fragmented into smaller pieces while traversing a network. This identifier is assigned by the transmitting host so that different fragments arriving at the destination can be associated with each other for re-assembly. For example, if while traversing the network a router fragments the packet, the router will use the IP identification number in the header with all the fragments. Thus, when the fragments arrive at their destination they can be easily identified.

Flags 510 is used for fragmentation and re-assembly. The first bit is called "More Fragments" (MF) bit, and is used to indicate the last fragment of a packet so that the receiver knows that the packet can be re-assembled. The second bit is the "Do not Fragment" (DF) bit, which suppresses fragmentation. The third bit is unused and is always set to zero (0). Fragment Offset 512 indicates the position of the fragment in the original packet. In the first packet of a fragment stream, the offset will be zero (0). In subsequent fragments, this field indicates the offset in increments of 8 bytes. Thus, it allows the destination IP process to properly reconstruct the original data packet. Time-to-Live 514 maintains a counter that gradually decrements each time a router handles the data packet. When it is decremented down to zero (0), the data packet is discarded. This keeps data packets from looping endlessly on the network. Protocol 516 indicates which upper-layer protocol (e.g., TCP, UDP etc.) is to receive the data packets after IP processing has completed. Checksum 518 helps ensure the IP header integrity. Source IP Address 720 specifies the sending node and destination IP Address 722 specifies the receiving node. Options 524 allows IP to support various options, such as security.

As mentioned before, with the use of the Gigabit Ethernet the whole range of identification numbers may repeat every second. The invention proposes to use a non-unique identification number whenever the "Do not fragment" bit is set in Flags 510. That is, all packets having the "do not fragment" bit set will have the same IP identification number. This then may allow unique IP identification numbers to be used with packets that may be fragmented when re-assembly is to occur within one second. Of course, if all the packets generated within a second are to be fragmented, the invention may be obviated.

Figure 6:
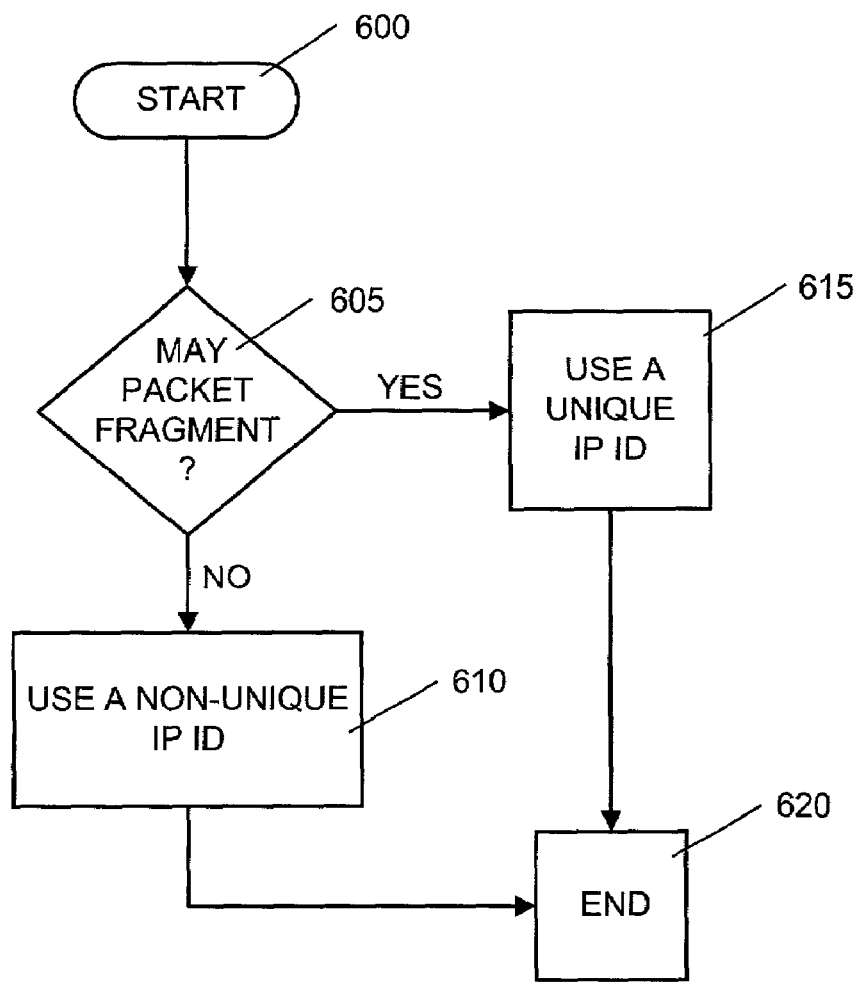
FIG. 6 is a flow chart of a process that may be used with the invention.

FIG. 6 is a flow chart of a process that may be used with the invention. The process starts each time data is to be transmitted over a network (step 600). The data is divided into packets and each packet is supplemented with an IP header. To ascertain whether a unique identification number may be used in the identification field of the IP header packets, a check is made to determine whether the packet is allowed to be fragmented in transit. If so, a unique identification number is used in the IP header identification field of the packet and the process ends (steps 605, 615 and 620). If not, a non-unique number is used. The non-unique number may be chosen to be zero (0) for instance or may be any other number and the process ends (steps 605, 610 and 620).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of maintaining a two-byte identification field of an Internet protocol (IP) header of a packet of data, the packet of data being transmitted over a network, the method comprising the steps of:
    determining whether the packet of data is permitted to be fragmented before being transmitted over the network wherein an identification number can be used more than once within a particular time span;
    using a unique identification number in the IP header of the packet of data if the packet of data is permitted to be fragmented, the unique identification number being a number that will not be used in the IP header of any other packet of data within the particular time span; and
    using a non-unique identification number in the IP header of the packet of data if the packet of data is not permitted to be fragmented, the non-unique identification number being a number that is used in the IP header of all packets of data that are not permitted to be fragmented to facilitate using unique identification numbers in the network.

2. The method of claim 1 wherein a bit is set in the IP header to indicate whether the packet is permitted to be fragmented.

3. The method of claim 2 wherein the bit is set in a flag field of the IP header.

4. A computer readable medium encoded with a computer program product, when executed by a computer, for maintaining a two-byte identification field of an Internet protocol (IP) header of a packet of data, the packet of data being transmitted over a network, the computer program product comprising:
    code means for determining whether the packet of data is permitted to be fragmented before being transmitted over the network wherein an identification number can be used more than once within a particular time span;
    code means for using a unique identification number in the IP header of the packet of data if the packet of data is permitted to be fragmented, the unique identification number being a number that will not be used in the IP header of any other packet of data within the particular time span; and
    code means for using a non-unique identification number in the IP header of the packet of data if the packet of data is not permitted to be fragmented, the non-unique identification number being a number that is used in the IP header of all packets of data that are not permitted to be fragmented to facilitate using unique identification numbers in the network.

5. The computer program product of claim 4 wherein a bit is set in the IP header to indicate whether the packet is permitted to be fragmented.

6. The computer program product of claim 5 wherein the bit is set in a flag field of the IP header.

7. An apparatus for maintaining a two-byte identification field of an Internet protocol (IP) header of a packet of data, the packet of data being transmitted over a network, the apparatus comprising:
   means for determining whether the packet of data is permitted to be fragmented before being transmitted over the network wherein an identification number can be used more than once within a particular time span;
   means for using a unique identification number in the IP header of the packet of data if the packet of data is permitted to be fragmented, the unique identification number being a number that will not be used in the IP header of any other packet of data within the particular time span; and means for using a non-unique identification number in the IP header of the packet of data if the packet of data is not permitted to be fragmented, the non-unique identification number being a number that is used in the IP header of all packets of data that are not permitted to be fragmented to facilitate using unique identification numbers in the network.

8. The apparatus of claim 7 wherein a bit is set in the IP header to indicate whether the packet is permitted to be fragmented.

9. The apparatus of claim 8 wherein the bit is set in a flag field of the IP header.

10. A computer system for maintaining a two-byte identification field of an Internet protocol (IP) header of a packet of data, the packet of data being transmitted over a network, the computer system comprising:
    at least one memory device for storing code data; and
    at least one processor for processing the code data to determine whether the packet of data is permitted to be fragmented before being transmitted over the network wherein an identification number can be used more than once within a particular time span, to use a unique identification number in the IP header of the packet of data if the packet of data is permitted to be fragmented, the unique identification number being a number that will not be used in the IP header of any other packet of data within the particular time span, and to use a non-unique identification number in the IP header of the packet of data if the packet of data is not permitted to be fragmented, the non-unique identification number being a number that is used in the IP header of all packets of data that are not permitted to be fragmented to facilitate using unique identification numbers in the network.

11. The computer system of claim 10 wherein a bit is set in the IP header to indicate whether the packet is permitted to be fragmented.

12. The computer system of claim 11 wherein the bit is set in a flag field of the IP header.

* * * * *